United States Patent [19]
Pelousek et al.

[11] 3,940,367
[45] Feb. 24, 1976

[54] PREPARATION OF HIGH MOLECULAR POLYESTERS OF 1,4-BUTANEDIOL

[75] Inventors: Herbert Pelousek, Dormagen; Alfred Horbach; Ludwig Bottenbruch, both of Krefeld-Bockum; Rudolf Binsack, Krefeld, all of Germany

[73] Assignee: Bayer Aktiengesellschaft, Leverkusen, Germany

[22] Filed: Aug. 6, 1974

[21] Appl. No.: 495,190

[30] Foreign Application Priority Data
Aug. 10, 1973 Germany............................ 2340559

[52] U.S. Cl..... 260/45.95 R; 260/40 P; 260/45.7 P; 260/45.8 R; 260/75 M; 260/475 P
[51] Int. Cl.$^2$.......................................... C08G 63/34
[58] Field of Search ..... 260/75 M, 45.8 R, 45.95 R, 260/45.7 P, 475 P

[56] References Cited
UNITED STATES PATENTS
2,907,753  10/1959  Maclean et al. ...................... 260/75

FOREIGN PATENTS OR APPLICATIONS
2,059,539  6/1971  Germany

Primary Examiner—Howard E. Schain
Attorney, Agent, or Firm—Connolly and Hutz

[57]  ABSTRACT

Low-molecular polyesters prepared by the condensation of diols and dicarboxylic acid dialkyl esters show a substantially improved capactiy to undergo polycondensation in a susequent polycondensation below the melting point if said low-molecular polyesters are prepared from pressure trans-esterification products by polycondensation in the melt.

7 Claims, No Drawings

PREPARATION OF HIGH MOLECULAR POLYESTERS OF 1,4-BUTANEDIOL

The invention relates to the preparation of high molecular polyesters or copolyesters from dialkyl esters of terephthalic acid or isophthalic acid and 1,4-butanediol.

Polybutylene terephthalate and polybutylene isophthalate are in themselves known. These polyesters are mostly prepared by trans-esterifying dialkyl esters of terephthalic acid or isophthalic acid with 1,4-butanediol at low temperatures to give the corresponding bis-ω-hydroxybutyl esters and subsequently condensing these products in the melt at higher temperatures, with elimination of 1,4-butanediol, to give the polyester. It is often necessary to post-condense the resulting polyesters below their melting point in order to increase the molecular weight. Only the post-condensed polyesters are suitable for preparing high-quality shaped articles by injection moulding or extrusion.

In the trans-esterification of terephthalic acid or isophthalic acid dialkyl esters with 1,4-butanediol, tetrahydrofurane is produced as a by-product by cyclising dehydration of 1,4-butanediol. In this side-reaction, up to about 20% of the butanediol employed can be lost. It has therefore been proposed [compare DT-OS (German Published Specification) No. 2,045,914 and DT-OS (German Published Specification) No. 2,059,539,] to reduce the formation of tetrahydrofurane by using less than 2 mols of 1,4-butanediol per mol of dicarboxylic acid dialkyl ester and by lowering the pressure used in the trans-esterification reaction.

In the subsequent polycondensation of the transesterification products, which is generally carried out at about 240° – 290°C under reduced pressure, an oligoester results as a by-product and this distils off together with the 1,4-butanediol split off. This oligo-ester, after some time, blocks the zone between the vacuum generator and the polycondenser, which leads to considerable technical difficulties.

Little is known from the literature about the influence of the pressure used in the trans-esterification of lower dialkyl esters of terephthalic acid or isophthalic acid with 1,4-butanediol on the molecular weight achievable in the polycondensation. Whilst DT-OS (German Published Specification) No. 2,059,539, which relates to a process for the preparation of polybutylene terephthalate, mentions transesterification under pressure as a possible procedure, it at the same time describes the variant under normal pressure as being preferred.

It was to be expected that increasing the pressure used in the trans-esterification of lower dialkyl esters of terephthalic acid or isophthalic acid with 1,4-butanediol — particularly in cases in which less than 2 mols of 1,4-butanediol are employed per mol of dicarboxylic acid ester — would, because of a less favourable equilibrium being established, lead to products which display a reduced capacity to undergo polycondensation than do products trans-esterified under normal pressure. In fact it proves true that in a polycondensation carried out in the customary manner, trans-esterification products obtained under elevated pressure give polyesters with molecular weights substantially reduced by comparison.

However, surprisingly and unforeseeably for an expert, low molecular polyesters which have been prepared from pressure trans-esterification products by polycondensation in the melt show a substantially improved capacity to undergo polycondensation, in a subsequent polycondensation below the melting point, in comparison with higher-molecular polyesters which have been prepared from normal pressure trans-esterification products. It is therefore possible to obtain, in this way, polybutylene terephthalates and polybutylene isophthalates which under otherwise comparable conditions of preparation exhibit a substantially higher molecular weight. Because of the distinctly higher molecular weight the polyesters prepared in this way show an improved pattern of long-term properties.

The present invention is based on the realisation that the trans-esterification of terephthalic acid or isophthalic acid dialkyl esters with 1,4-butanediol under elevated pressure leads to a substantial reduction in tetrahydrofurane formation, that the trans-esterification product thus obtained gives polycondensates with higher molecular weights in the subsequent polycondensation and that the amount of the oligoesters is lowered.

Accordingly, the subject of the invention is a process for the condensation of diols and dicarboxylic acid dialkyl esters, which is characterized in that 1,4-butanediol or its mixture with at most 10 mol percent of another diol is condensed with dialkyl esters of terephthalic acid and/or isophthalic acid or mixtures of these esters with at most 10 mol percent of other dicarboxylic acid dialkyl esters, and that in this method a. 1 mol of the dicarboxylic acid dialkyl ester is transesterified with 1.05 to 1.9 mols of the diol in the presence of 0.01 to 0.4 percent by weight of a catalyst, relative to the dicarboxylic acid dialkyl ester, at a pressure of 2 – 10 bars and a temperature of 180° to 230°C, b. the trans-esterification product is polycondensed in the melt at 230° – 300°C under reduced pressure of 0.1 to 5 mm Hg and c. the polyester thus obtained is further condensed at a temperature of 5° to 50°C below its melting point, under reduced pressure or under an inert gas atmosphere, until its intrinsic viscosity lies in the range from 0.6 to 1.9 dl/g.

1,4-Butanediol is used as a starting material for the process. However, up to 10 mol percent thereof can be replaced by other diols. Other diols are preferably aliphatic diols of the formula OH—$(CH_2)_n$—OH, wherein $n = 2$, 3 or 5 to 10, such as, for example, hexanediol or ethylene glycol. Cyclohexanedimethanol and neopentyl glycol are also suitable.

Dialkyl esters of terephthalic acid, dialkyl esters of isophthalic acid or optional mixtures of these two esters are used as the second starting product. The alkyl groups in general contain 1 – 6 carbon atoms. Up to 10 mol percent of these esters can be replaced by corresponding other dicarboxylic acid esters. In particular it is possible to use the $C_1 - C_6$ dialkyl esters of aliphatic dicarboxylic acids of the formula HOOC—$(CH_2)_n$—COOH, wherein $n = 0 - 8$, such as oxalic acid diethyl ester, succinic acid dimethyl ester, adipic acid diethyl ester and diesters of aromatic dicarboxylic acids, for example of napthalenedicarboxylic acids, of 4,4'-benzophenonedicarboxylic acid and of diphenyl-sulphonedicarboxylic acid. In general, 1.05 to 1.9 mols, preferably 1.1 to 1.5 mols, of diol are used per mol of dicarboxylic acid ester.

Catalysts for the first stage of the process, which are used in amounts of 0.01 to 0.4 per cent by weight, based on the diesters, are, in particular, titanic acid tetraalkyl esters, preferably with 1 – 6 carbon atoms in the alkyl group, such as, for example, titanium tetraisopropylate. The first stage is carried out at a superatmospheric pressure of 2 – 10 bars, preferably 3 – 6 bars. The reaction temperature is 180°– 230°C, preferably 200° – 220°C.

The intrinsic viscosity is determined by viscosity measurements, using tetrachloroethane/phenol in the weight ratio of 1:1 as the solvent, and extrapolation to the limiting value for concentration 0 in accordance with the following equation:

$$[\eta] = \lim_{c \to 0} \frac{\eta \text{ specific}}{c} \, [dl/g]$$

The process can be carried out either discontinuously in suitable autoclaves, or continuously.

Furthermore, stabilisers can be added before, during and after the polycondensation. These stabilisers are preferably organic phosphites and phosphates or sterically hindered phenols, for example decyl-diphenyl-phosphite, tris-nonylphenyl-phosphite, phenyl-neopentyl-phosphite, distearyl-dipentaerythritol-diphosphite and triphenyl-phosphate.

5 to 80 percent of reinforcing fillers, preferably glass fibres, relative to the total weight of polyester and filler, can be added to the polyesters or copolyesters prepared according to the invention.

Furthermore, the polyesters or copolyesters prepared according to the invention can contain flame-retarding additives.

As flame-retarding additives it is possible to use all known flameproofing agents, preferably combinations of halogencontaining organic compounds, for example halogenated benzenes, halogenated diphenyl ethers, halogenated diphenyls and polyphenyls and halogenated polycarbonates (preferably prepared from tetrabromo-bis-phenol A) with organic or inorganic antimony compounds, for example antimony trioxide, elementary phosphorus or phosphorus compounds.

The amount of the flame-retarding additive is generally about 2 to 30 percent by weight, preferably 5 to 15 percent by weight, relative to polyester and filler.

The polyesters and copolyesters obtained in accordance with the invention can, because of their high molecular weight, be converted, for example by injection moulding or extrusion, into shaped articles having excellent long-term use properties.

EXAMPLE 1 (COMPARISON EXAMPLE)

80 kg of dimethyl terephthalate and 40.8 kg of 1,4-butanediol (1.1 mols of 1,4-butanediol per 1 mol of dimethyl terephthalate) are trans-esterified in the presence of 0.05% of titanium tetraisopropylate, relative to dimethyl terephthalate, in an autoclave for 3 hours at 180° to 200°C (approx. 2 hours at 180° and approx. 1 hour at 200°C). After transfer by pumping into a polycondensation reactor, the transesterified product is polycondensed in the reactor at 260°C and 1 mm Hg for 2 hours. The polyester is spun out as a ribbon and after crystallization is granulated to give approx. 3 mm cylinders. The polyester granules are then post-condensed for 24 hours at 200°C in a stream of nitrogen (1 m³ of nitrogen/hour in a tumbler reactor, at a speed of revolution of 10 revolutions/minute.

EXAMPLES 2 TO 4

Example 1 is repeated but the trans-esterification is carried out under a pressure of 2 bars (Example 2), 3 bars (Example 3) and 4 bars (Example 4).

The results, including the dependence of the viscosity on the trans-esterification pressure, are shown in Table I.

Table I

| Example | Molar ratio[1] | Trans-esterification pressure (bars) | Loss of 1,4-butanediol (as tetrahydrofurane) % | Viscosity of the polybutylene terephthalate after the polycondensation | | | |
|---|---|---|---|---|---|---|---|
| | | | | in the melt (260°C) | | in the solid phase below the melting point of the polyester (200°C) | |
| | | | | Intrinsic viscosity[2] (dl/g) | Melt viscosity[3] (poise) | Intrinsic viscosity[2] (dl/g) | Melt viscosity[3] (poise) |
| 1 | 1 : 1.1 | 1 | 1.8 | 1.085 | 2,300 | 1.368 | 5,200 |
| 2 | 1 : 1.1 | 2 | 1.1 | 1.055 | 1,990 | 1.455 | 6,100 |
| 3 | 1 : 1.1 | 3 | 0.9 | 1.029 | 1,690 | 1.690 | 7,500 |
| 4 | 1 : 1.1 | 4 | 0.7 | 1.002 | 1,460 | 1.751 | 9,100 |

[1] Mols of 1,4-butanediol/mols of terephthalic acid dimethyl ester
[2] in 1 : 1 tetrachloroethane/phenol
[3] measured in a disk cone viscometer at 280°C:

| | |
|---|---|
| speed of revolution: | 2.7 – 16.2 revolutions/minute |
| load: | 2 kp |
| nitrogen flow: | 6 l/minute |
| cone No.: | PK II |
| rate of shear: | 46.38–2,738 sec⁻¹ |

EXAMPLES 5 – 7

In these experiments, the molar ratio of the reactants is varied. The modified reaction conditions as compared to Example 1, and the results of the polycondensation, can be seen from the table which follows:

| Ex. | Molar ratio of butanediol/ dimethyl terephthalate | Trans-esterification duration (hours) | Trans-esterification temperature (°C) | Trans-esterification pressure (bars) | Loss of 1,4-butanediol (as tetra-hydrofurane) (%) | Polycondensation time at 265°C (hours) | Viscosity of the polybutylene terephthalate after the polycondensation in the melt (265°C) Intrinsic[1] viscosity (dl/g) | Melt[2] viscosity (poise) | in the solid phase below the melting point of the polyester (200°C) Intrinsic[1] viscosity (dl/g) | Melt[2] viscosity (poise) |
|---|---|---|---|---|---|---|---|---|---|---|
| 4 | 1 : 1.1 | 2 | 180 | 4 | 0.7 | 2.0 (260°C) | 1.002 | 1,460 | 1.751 | 9,100 |
|   |   | 1 | 200 | 4 |   |   |   |   |   |   |
| 5 | 1 : 1.2 | 2 | 180 | 5 | 0.7 | 2.1 | 0.980 | 1,200 | 1.682 | 8,500 |
|   |   | 2 | 200 | 5 |   |   |   |   |   |   |
| 6 | 1 : 1.4 | 2 | 180 | 5 | 0.8 | 2.0 | 0.985 | 1,350 | 1.663 | 8,300 |
|   |   | 2 | 200 | 5 |   |   |   |   |   |   |
| 7 | 1 : 1.4 | 2 | 180 | 5 | 0.9 | 2.4 | 0.965 | 1,050 | 1.672 | 8,400 |
|   |   | 2 | 220 | 1 |   |   |   |   |   |   |

[1] in 1:1 phenol/tetrachloroethane
[2] at 280°C, see page 7

EXAMPLE 8

794 kg of dimethyl terephthalate, 505 kg of 1,4-butanediol (corresponding to a molar ratio of 1.4 mols of 1,4-butanediol to 1 mol of dimethyl terephthalate) and 740 g of titanium tetraisopropylate (corresponding to 0.093%, relative to dimethyl terephthalate) as a 15 percent strength solution in 1,4-butanediol, are metered hourly into a continuously operating apparatus at a preheating temperature of 160°C. The trans-esterification zone is heated to 210°C. The transesterification is carried out at a pressure of 3 bars set by means of a vapour valve until the trans-esterification has produced 70% of the methanol which can be split off, that is to say until the amount of methanol split off hourly is 183 kg.

The amount of tetrahydrofurane formed hourly is 1.76 kg, corresponding to a loss of 0.4% of 1,4-butanediol.

The trans-esterification product is then pumped into an intermediate container, where the pressure is lowered to 15 mm Hg. The polycondensation is continued, until the viscosity maximum is reached, in a subsequent polycondensation reactor at a temperature of 260°C and a pressure of 2 mm Hg. The spun-out and granulated polybutylene terephthalate has an intrinsic viscosity of 1.018 dl/g and a melt viscosity (at 280°C) of 1,480 poise.

During a post-condensation at 200°C under the conditions mentioned in Example 1, the intrinsic viscosity rises to 1.528 dl/g and the melt viscosity (at 280°C) rises to 6,800 poise.

We claim:

1. A process for the condensation of diols and dicarboxylic acid dialkyl esters wherein 1,4-butanediol or its mixture with at most 10 mol percent of another diol is condensed with a member selected from the group consisting of dialkyl esters of terephthalic acid, dialkyl esters of isophthalic acid and mixtures thereof or said selected member with at most 10 mol percent of at least one other dicarboxylic acid dialkyl ester, and wherein
   a. 1 mol of the dicarboxylic acid dialkyl ester is transesterified with 1.05 to 1.9 mols of the diol in the presence of 0.01 to 0.4 percent by weight of titanic acid tetraalkyl ester based on the dicarboxylic acid dialkyl ester, at a pressure of 2–10 bars and a temperature of 180° to 230°C.,
   b. the trans-esterification product is polycondensed in the melt at 230°–300°C. under reduced pressure of 0.1 to 5 mm Hg and
   c. the polyester thus obtained is further condensed at a temperature of 5° to 50°C. below its melting point, under reduced pressure or under an inert gas atmosphere, until its intrinsic viscosity is from 0.6 to 1.9 dl/g.

2. The process of claim 1 wherein the transesterification is carried out discontinuously.

3. The process of claim 1 wherein the transesterification is carried out continuously.

4. The process of claim 1 wherein a stabilizer is added before, during or after the polycondensation.

5. The process of claim 4 wherein said stabilizer is at least one member selected from the group consisting of organic phosphites and organic phosphates.

6. The process of claim 5 wherein said at least one stabilizer is selected from the group consisting of decyl-diphenyl-phosphite, tris-nonylphenyl-phosphite, phenylneopentyl-phosphite, distearyl-dipentaerythritol-diphosphite and triphenyl-phosphate.

7. The process of claim 4 wherein said stabilizer is a sterically hindered phenol.

* * * * *